A. H. SHERWOOD.
Improvement in Weeding Machines.
No. 123,944. Patented Feb. 20, 1872.
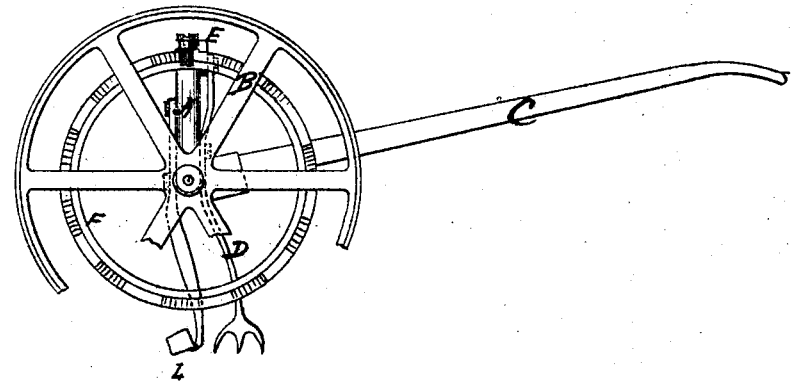
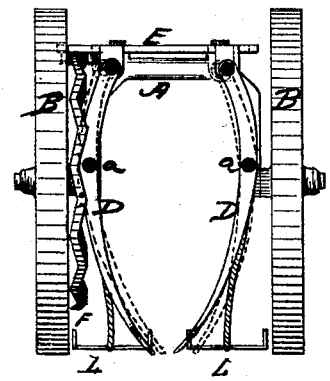

UNITED STATES PATENT OFFICE.

ARTHUR H. SHERWOOD, OF SOUTHPORT, CONNECTICUT, ASSIGNOR TO HIMSELF, JOHN S. FRAY, AND HORACE PIGG.

IMPROVEMENT IN WEEDING-MACHINES.

Specification forming part of Letters Patent No. 123,944, dated February 20, 1872.

*To all whom it may concern:*

Be it known that I, ARTHUR H. SHERWOOD, of Southport, in the county of Fairfield and State of Connecticut, have invented a new and useful Improvement in Weeding-Machine; and I do hereby declare the following, when taken in connection with the accompanying drawing and the letters of reference marked thereon, to be a full, clear, and exact description, and which said drawing constitutes part of this specification, and represents in—

Figure 1, a side view, and in Fig. 2, a front view.

This invention relates to an improvement in machine for weeding vegetables or plants sown in drills, and at the same time to loosen the earth around the plants; and the invention consists in the use of a fork or pair of forks or equivalent device, to which a vibrating movement is given, the said forks traversing each side the drill, and taking into the earth sufficiently to loosen and draw the weeds; also, in combining with such forks or device a hoe or hoes running in advance to loosen and raise the earth, as more fully hereinafter described.

On a suitable frame or axle, A, a pair of wheels, B, are arranged as the carriage, upon which the mechanism is adjusted, and this carriage is propelled by means of shafts C, or other device. On the frame at *a* the levers D are pivoted, the lower ends of which are fitted with a fork of several prongs, or may be with plates like hoes. I prefer the forks, as seen in Fig. 1. The upper end of said lever is attached to a bar, E, and to this bar E a reciprocating movement is imparted by a cam-wheel, F, or other suitable device. This reciprocating movement of the bar gives to the levers a corresponding vibratory movement, as denoted in broken lines, Fig. 2. This device is run over the drill, one of the forks or levers being upon each side. The forks taking into the earth at the drill pull the weeds therefrom. If plates are used, the action will be substantially the same, but the forks will produce the best results. If but a single fork or lever be used, it will be necessary to go over the drill twice, that both sides may be weeded. Immediately in front of the forks I arrange, upon each side, a hoe, L, which, as the machine advances, moves along below the surface, loosening the earth in advance of the forks, the combined action of the two tending not only to remove the weeds, but to throw the earth up around the plants.

This invention is especially designed for weeding onions, but is equally applicable to weeding other plants or vegetables. The forks and hoes may be made adjustable to take a greater or less distance into the earth, or into a different relative position.

By the term fork I wish to be understood as embracing any suitable device attached to the said levers to accomplish the desired result.

I claim—

The vibrating levers D, provided with a fork or equivalent device at the lower end, and arranged to operate substantially as set forth.

ARTHUR H. SHERWOOD.

Witnesses:
A. J. TIBBITS,
JOHN H. SHUMWAY.